Sept. 15, 1970 C. COUPIN 3,529,150

ELECTRONIC TRACK CIRCUIT FOR RAILWAY SIGNALLING

Filed March 14, 1968

INVENTOR
Claude COUPIN

Raymond A. Robic
ATTORNEY

United States Patent Office 3,529,150
Patented Sept. 15, 1970

3,529,150

ELECTRONIC TRACK CIRCUIT FOR RAILWAY SIGNALLING

Claude Coupin, Epinay-sur-Seine, France, assignor to Societe de Constructions Electromecaniques Jeumont-Schneider, Paris, France Filed Mar. 14, 1968, Ser. No. 713,020
Claims priority, application France, Mar. 17, 1967, 99,165
Int. Cl. B61l *21/00;* H04b *1/10*
U.S. Cl. 246—34 4 Claims

ABSTRACT OF THE DISCLOSURE

An electronic track circuit wherein short voltage pulses are supplied to the rails of the track at one end of a zone and picked up at the other end, the pulses being converted into signals whose frequency is half the recurrence frequency.

BACKGROUND OF THE INVENTION

Field of the invention

The present invention relates to an electronic track circuit having a short zone of action which does not necessitate the insulation of the track section concerned, which may be employed in combination with other track circuits without detrimentally affecting their operation and which conversely is not disturbed thereby. The track circuit according to the invention can operate perfectly on tracks laid on poor ballast which are not frequently employed and on which the axles of the rolling stock therefore afford only poor shunting. Its zone of action may be precisely defined and it only requires a low-voltage battery as its source of supply.

SUMMARY OF THE INVENTION

According to the present invention there is provided an electronic track circuit including a generator for supplying voltage pulses of short duration and small amplitude to the two rails of a railway track at one end of a short zone, means for picking up the voltage pulses at the other end of the short zone and a receiver connected to the pick-up means, said receiver comprising a first filtering circuit responsive to the time of rise of the pulses received, a circuit for eliminating parasitic signals, a circuit for converting the pulses into signals whose frequency is half the recurrence frequency, and a second filtering circuit for controlling the recurrence frequency of the pulses.

BRIEF DESCRIPTION OF THE DRAWINGS

The present invention will now be described in greater detail by way of examples with reference to the accompanying drawing, wherein.

DESCRIPTION OF THE PREFERRED EMBODIMENT

Figure 1:
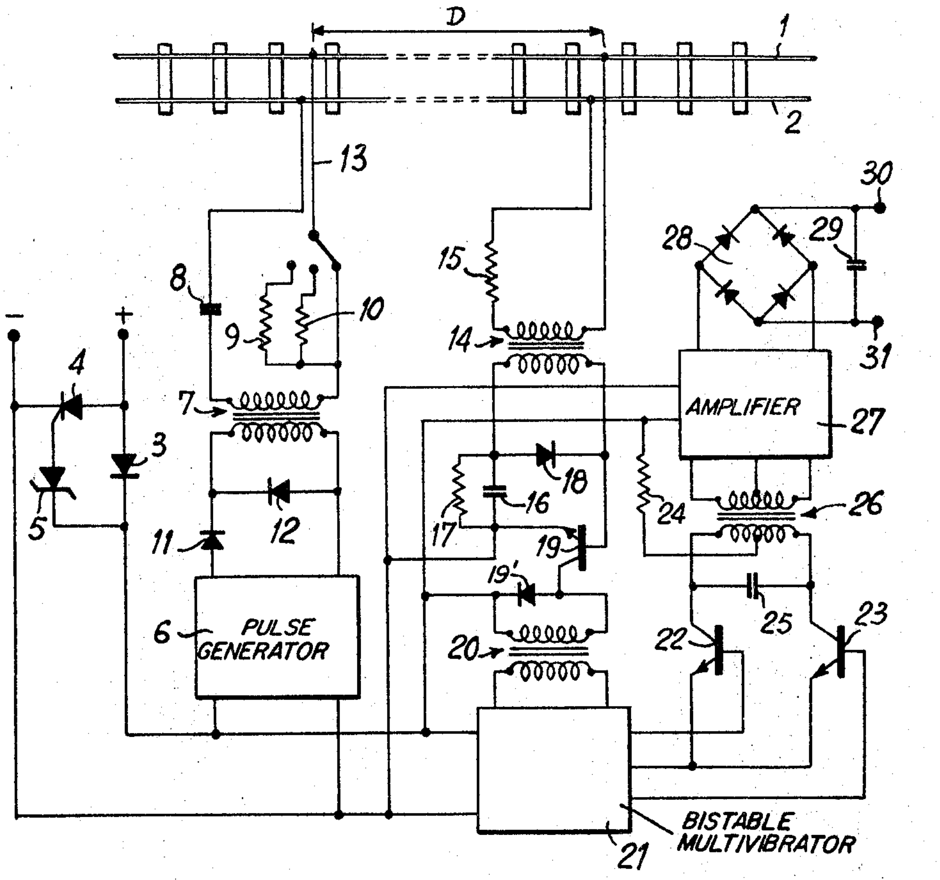
FIG. 1 is a circuit diagram of a preferred form of track circuit.

The elements not denoted by reference numerals form part of known circuits, of which they constitute the usual elements.

Referring to FIG. 1, the track circuit is represented in the upper part by its two rails 1 and 2, which are supplied in the left-hand part by a pulse generator, and which are connected to a receiver in the right-hand part at a short distance D (about thirty meters). All the elements of the track circuit are arranged in a common casing and are supplied by a low-voltage battery (for example 24 volts), of which only the positive and negative terminals are shown. The direct-current supply is protected from a possible polarity reversal by a diode 3 and from over voltages by the association of a thyristor 4 and a Zener diode 5. This direct-current circuit supplies a pulse generator 6 including a unijunction transistor. The output from the pulse generator 6 which consists of voltage pulses of short duration (for example 10 to 20 $\mu$s.) is applied to an impedance matching transformer 7 with the interposition of diodes 11 and 12 which afford protection against transient voltages emanating from the track. The secondary winding of the transformer 7 is connected to the track through a blocking capacitor 8 and a resistor 9 or a resistor 10 or a direct connection to permit the matching of the circuit as function to the length of the connecting cable 13.

The receiver comprises a transformer 14, the primary winding of which is in series with a resistor 15 to perform the function of a high-pass filter, and the secondary winding of which therefore feeds a transistor 19 only with high frequencies, or pulses whose time of rise is short. The peak clipping of the inverse part of these pulses is effected by a diode 18.

Each pulse whose amplitude permits a base current to be set up in the transistor 19 charges a capacitor 16, which partially discharges through a resistor 17 between two successive pulses, so that the succeeding pulse is just sufficient to ensure saturation of the transistor 19. There is thus obtained a threshold which is shifted as a function of the amplitude of the input signal, and which prevents the circuit from being disturbed by parasitic signals with pulses of appropriate amplitude. Moreover, the presence of the capacitor 16 and the resistor 17 makes it possible to reduce the distance required between two neighboring track circuits situated on the same track.

The output from the transistor 19 is applied to a voltage matching transformer 20. A diode 19' is provided in the output of transistor 19 to protect transistor 19 against the overvoltages appearing in the inductive circuit of the primary winding of transformer 20 when transistor 19 is cut off. The pulses filtered by the transformer 14 associated with the resistor 15 and amplified by the transistor 19 then enter a bistable multi-vibrator circuit 21 of known type, in which they are converted into square-wave signals whose frequency is half the recurrence frequency.

The output of the bistable multi-vibrator circuit 21 is connected to a selective amplifier, composed of two transistors 22 and 23 and a tuned filter assembly comprising a transformer 26, a capacitor 25 and a resistor 24. The filter assembly is tuned to a frequency which is half the recurrence frequency of the pulses. Only this half-frequency is therefore transmitted to an amplifier 27, the output voltage of which is rectified by a diode bridge 28 and filtered by a capacitor 29, so as to produce between terminals 30 and 31 a unidirectional voltage which provides the final information, i.e. which is capable of actuating an on-off relay or any other appropriate device. In operation, when a train passes over the short track zone of length D, the rails 1 and 2 are short-circuited. This prevents the transmission of the pulses from the generator to the receiver and produces, for example, the release of the on-off track relay.

In the foregoing description there is mentioned the amplifier stage 27 for providing a sufficiently high power at the output of the receiver. This stage could be omitted from the circuit diagram if a low-consumption relay were connected.

The use of the device is not limited to an electronic track circuit having a short zone of action. Owing to the high apparent frequency of the pulses, the same device may also be employed to detect the presence of an axle when the distance D is reduced to a few centimeters.

Figure 2:
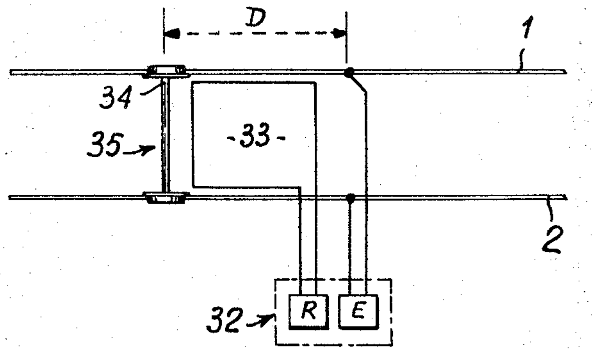
FIG. 2 is a modified form of the track circuit shown in FIG. 1.

FIG. 2 illustrates a modified form of the track circuit, wherein the transmitter E and the receiver R are the same as in the preceding case, and are disposed in the same casing 32, but the receiving system R, instead of being connected to the rails 1 and 2 is connected to an inductor frame 33 disposed between the rails. When the axle 34 of a railway wagon or coach running on the track in the direction of the arrow 35 arrives in proximity to the inductor frame 33 spread out along the track over a distance of a few centimeters, the frame has a voltage induced therein owing to the proximity of the axle. The system may then be employed to establish the presence of a railway wagon or coach on the track within the zone.

I claim:

1. An electronic track circuit for detecting the presence of a railway wagon or coach within a railway zone including a generator for supplying voltage pulses of short duration and small amplitude to the two rails of a railway track at one end of said zone, means for picking up the voltage pulses at a predetermined distance from said one end of said zone and a receiver connected to the pick-up means, said receiver comprising a first circuit for filtering out the pulses received from said pick-up means which have a short time of rise, a second circuit connected to said first circuit for obtaining a threshold voltage which is shifted as a function of the amplitude of the input signal provided by said first circuit thus preventing the track circuit from being disturbed by parasitic signals, a third circuit connected to said second circuit for converting the pulses received from said second circuit into signals whose frequency is half of the frequency of the pulses supplied by the generator, and a fourth circuit connected to said third circuit for controlling the frequency of the signals generated by said third circuit.

2. An electronic track circuit according to claim 1, wherein the pick-up means consists of a direct connection to each rail of the track at the other end of the zone.

3. An electronic track circuit according to claim 1, wherein the pick-up means consist of an inductor frame disposed between the rails and in which voltages are induced due to the presence of an axle of a railway wagon or coach within the zone.

4. An electronic track circuit according to claim 1, wherein said third circuit comprises a bistable multi-vibrator for converting the pulses received into square-wave signals.

References Cited

UNITED STATES PATENTS

| | | | |
|---|---|---|---|
| 2,525,634 | 10/1950 | Atwood et al. | 325—323 |
| 3,281,593 | 10/1966 | Mendelsohn | 246—249 |

ARTHUR L. LA POINT, Primary Examiner

G. H. LIBMAN, Assistant Examiner

U.S. Cl. X.R.

246—124; 325—323